(12) United States Patent
Aubin

(10) Patent No.: US 6,880,203 B1
(45) Date of Patent: Apr. 19, 2005

(54) INDEPENDENTLY ROTATABLE, SPLIT TREAD, SINGLE WHEEL ASSEMBLY

(75) Inventor: Philip A. Aubin, Tracy, CA (US)

(73) Assignee: Aubin Industries, Inc., Tracy, CA (US)

( * ) Notice: Subject to any disclaimer, the term of this patent is extended or adjusted under 35 U.S.C. 154(b) by 25 days.

(21) Appl. No.: 10/335,463

(22) Filed: Dec. 31, 2002

(51) Int. Cl.$^7$ .............................................. B60B 33/00
(52) U.S. Cl. .............................. 16/48; 16/45; 16/31 R; 16/40
(58) Field of Search ............................... 16/48, 45, 46, 16/47, 20, 21, 25, 31 R, 31 A; 301/36.2; 384/482

(56) References Cited

U.S. PATENT DOCUMENTS

| | | | |
|---|---|---|---|
| 556,978 A | * | 3/1896 | Hetzel .............................. 16/48 |
| 1,160,121 A | * | 11/1915 | Allen .............................. 16/21 |
| 2,541,514 A | * | 2/1951 | Herold ........................ 295/8.5 |
| 2,618,490 A | * | 11/1952 | Frischmann .............. 280/43.12 |
| 2,995,771 A | * | 8/1961 | Mullikin ........................ 16/21 |
| 3,015,838 A | * | 1/1962 | Ulinski .......................... 16/21 |
| 3,106,408 A | | 10/1963 | Tomaiuolo |
| 3,628,214 A | * | 12/1971 | MacKay ...................... 16/35 R |
| 3,818,541 A | * | 6/1974 | Daniels ........................ 16/18 A |
| 4,054,335 A | * | 10/1977 | Timmer ....................... 384/482 |
| 4,122,580 A | * | 10/1978 | Black .............................. 16/46 |
| 4,173,810 A | | 11/1979 | James |
| 4,327,462 A | * | 5/1982 | Eggleston ........................ 16/47 |
| 4,706,329 A | | 11/1987 | Screen |
| 4,783,880 A | * | 11/1988 | Chapman et al. .............. 16/45 |
| 5,139,314 A | | 8/1992 | Deckler |
| 5,144,717 A | | 9/1992 | Siesholtz et al. |
| 5,149,116 A | | 9/1992 | Donze et al. |
| 5,161,635 A | | 11/1992 | Kiffe |
| 5,305,496 A | | 4/1994 | Gagnon et al. |
| 5,406,675 A | | 4/1995 | White |
| 5,517,718 A | | 5/1996 | Eichhorn |
| 5,581,843 A | | 12/1996 | Purnell |
| 5,810,373 A | | 9/1998 | Miranda |

FOREIGN PATENT DOCUMENTS

| | | | |
|---|---|---|---|
| EP | 356742 A1 | * | 3/1990 |
| JP | 09240208 A | * | 9/1997 |
| JP | 2002321504 A | * | 11/2002 |

* cited by examiner

Primary Examiner—Chuck Y. Mah
(74) Attorney, Agent, or Firm—Harris Zimmerman

(57) ABSTRACT

An independently rotating, split tread wheel assembly includes a pair of disks each having an outer tread formed of rubber or polyurethane compounds and supported on the periphery thereof. Each disk includes a central opening that receives a ball bearing assembly. A pair of hub inserts have central annular surfaces in adjacent relationship. A cylindrical spacer extends about the central annular surfaces and supports the inner races of the bearing assemblies so that the two disks turn independently about the hub inserts on their respective bearing assemblies. A pair of spaced apart caster bracket arms straddle the wheel assembly and impinge on the opposed outer surfaces of the hub inserts. An axle extends through aligned holes in the arms and through central bores in the hub inserts, and is secured thereto.

15 Claims, 3 Drawing Sheets

INDEPENDENTLY ROTATABLE, SPLIT TREAD, SINGLE WHEEL ASSEMBLY

CROSS-REFERENCE TO RELATED APPLICATIONS

Not applicable.

FEDERALLY SPONSORED RESEARCH

Not applicable.

SEQUENCE LISTING, ETC ON CD

Not applicable.

BACKGROUND OF THE INVENTION

1. Field of the Invention

This invention relates to wheel constructions, and more particularly, wheels used for casters in furniture, carts, and other movable objects.

2. Description of Related Art

Typically, caster designs tend to fall into one of two groups: the 'single wheel' and the 'twin wheel'. The single wheel caster (FIG. 1 is representative) consists of one wheel with an axle through the center which is attached to a clevis-like bracket that supports the axle at opposed ends. The bracket is joined to a bearing assembly that allows the caster to pivot about a generally vertical axis while also permitting rotation of the wheel about a generally horizontal axis, thereby allowing the caster to roll in any direction.

The other main type of caster design is the 'two wheel' caster (as represented in FIGS. 2 and 3), in which two wheels share a common axle, but are free to rotate separately. The axle is affixed to a central caster body, from which a vertically extending pivot shaft extends to the movable object. In this way, each wheel is free to rotate in opposite directions, facilitating a change in direction of the movable object. Also, the wheels may turn in the same direction for straight-line movement of the object.

The main problem of the single wheel caster is its inability to turn easily about the pivot. When changing direction, the wheel is required to pivot about the vertical axis of the bracket bearing assembly. Differing portions of the contact area of the wheel tread travel arcs of differing radii, requiring differing linear velocities, thus necessitating that some of the contact area is in rolling contact while other portions are sliding and dragging. The result is wear of the wheel, and greater rolling resistance, particularly at low speeds and tight turns. A narrower wheel minimizes this problem, but results in greater pressure (force per unit area) applied to the floor surface.

The two wheel caster offered an improvement over the single wheel in two important regards. The ability of the wheels to rotate at differing rates or in opposite directions at the same time greatly enhances the ability to turn about the vertical pivot axis, making a change in overall direction of the object much smoother. Also, the separation of the two wheels establishes a wide base for stability. One problem germane to this caster type is the method of attachment of the wheel to the axle. Unlike the single wheel with the clevis bracket supporting the outer ends of the axle, the two wheel design typically attaches each wheel to its respective end of the axle, the vertical pivot shaft being disposed in a plane between the two wheels. The axle is supported medially, and the wheels and the ends of the shaft are relatively unsupported, unprotected, and vulnerable to impact, which can result in collision-damaged wheels or a bent axle. This attachment configuration also creates some inherent stability inefficiencies. By not allowing the axle to extend through the wheel, the loading of the wheel on the axle is not symmetrical. That is, the inside of the wheel is fully loading the axle while the outside is not loading the axle at all. Also, the limited space remaining in the device for the wheel thickness results in thin wheels, which directly result in narrow annular (limited) bearing surfaces of the wheel on the axle. The two wheel design is typically limited to use in office furniture, where more casters are used (i.e., 5 or 6 casters per chair) and the loads on each caster thus are lighter and the objects are not often moved.

The prior art is deficient in providing a wheel that provides the advantages of independently rotating tread portions while avoiding the vulnerabilities of unprotected wheels and axle ends.

BRIEF SUMMARY OF THE INVENTION

The present invention generally comprises a wheel assembly that features two independently rotatable split treads in side-by-side relationship and supported on the same hub assembly. It is significant that the split tread design has substantially the same form factor and dimensions as a prior art single wheel used in a typical caster, as shown in FIG. 1, while providing superior pivoting and low speed turning characteristics.

The wheel assembly includes a pair of wheel disks each having an outer tread formed of rubber or polyurethane compounds and supported on the periphery of a wheel disk. Each disk includes a central opening that receives a ball bearing assembly. A pair of hub inserts are provided, the inserts having central annular surfaces in adjacent relationship. A cylindrical spacer extends about the central annular surfaces and supports the inner races of the bearing assemblies so that the two treads turn independently about the common spacer on their respective bearing assemblies. Thus the independently rotating treads are supported on the same structural element, and combine to define a form factor substantially the same as a typical prior art wheel used in caster assemblies.

A bracket for supporting the wheel assembly includes spaced apart arms disposed to straddle the wheel assembly and impinge on the opposed outer surfaces of the hub inserts. The spacing of the arms is typical of prior art casters that support a single wheel having a single tread. An axle extends through aligned holes in the arms and through central bores in the hub inserts, and is secured by a nut on a threaded distal end of the axle. The arms extend from a mounting bearing disposed to pivot about an axis generally orthogonal to the axle, whereby the bracket may pivot freely about the orthogonal axis. The mounting bracket includes a mounting plate having holes to enable affixing the mounting plate to any movable object. The arms may extend at a rake angle with respect to the mounting bearing so that the caster will pivot to follow any path of motion of the movable object.

The split tread single wheel assembly of the invention may also be employed with other support arrangements, such as a caster mounting bracket that is not pivotable with respect to the movable object, whereby the advantages of the independently rotating split tread are provided to the fixed direction caster assembly.

DETAILED DESCRIPTION OF THE INVENTION

Figure 1:
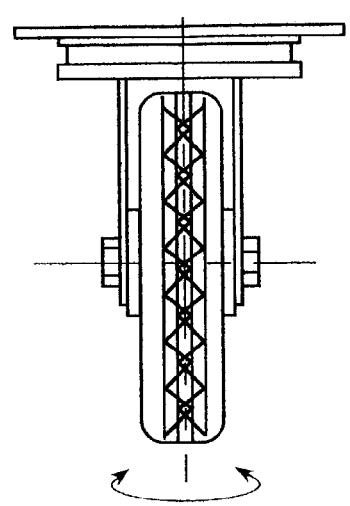
FIG. 1 is a front elevation of a typical prior art single wheel caster.
Figure 2:
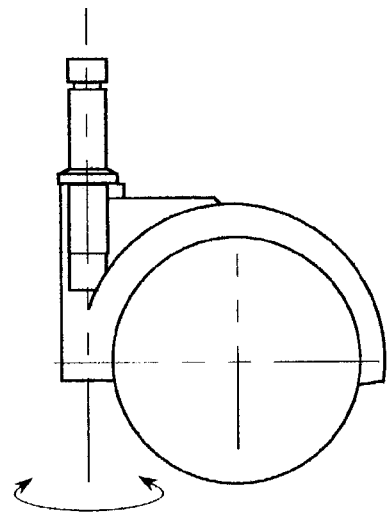
FIG. 2 is a side elevation of a typical prior art two wheel caster.
Figure 3:
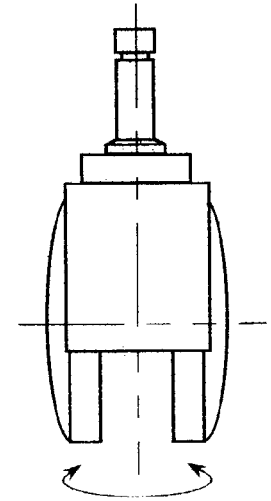
FIG. 3 is a front elevation of the prior art two wheel caster shown in FIG. 2.
Figure 4:
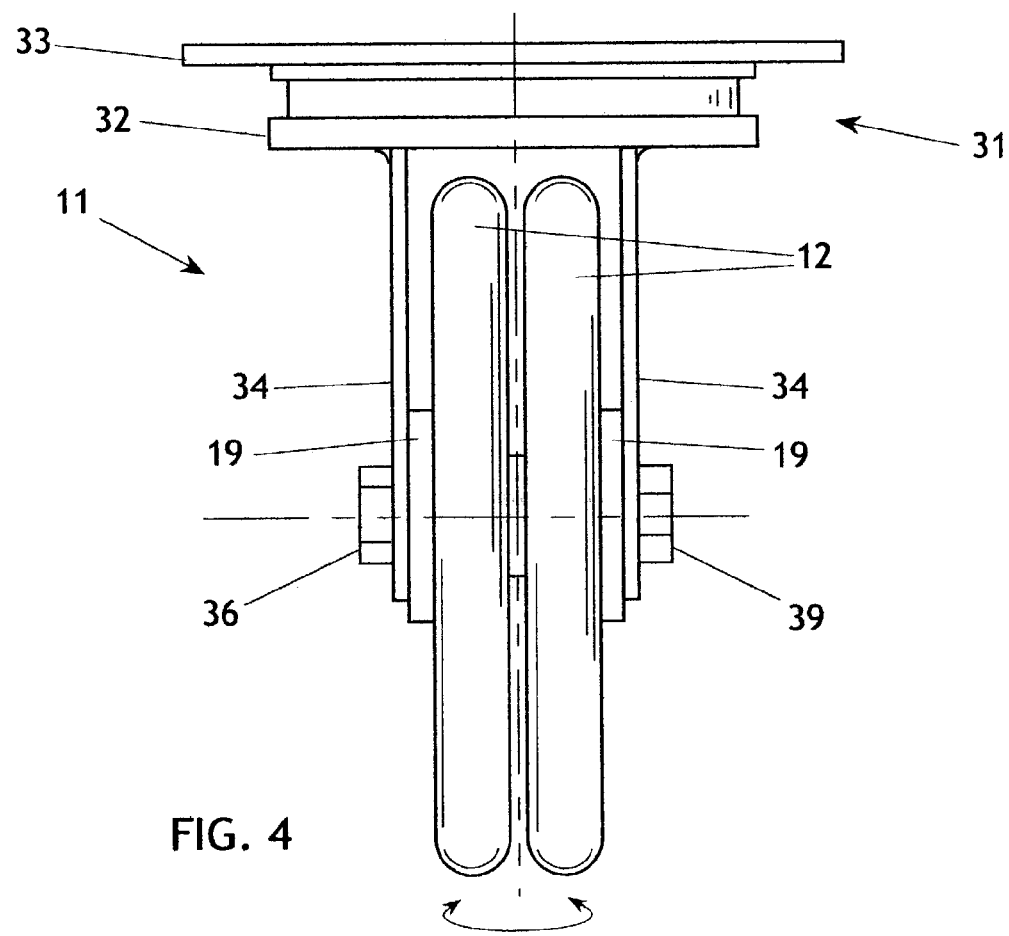
FIG. 4 is a front elevation of the independently rotating, split tread single wheel assembly of the present invention.
Figure 5:
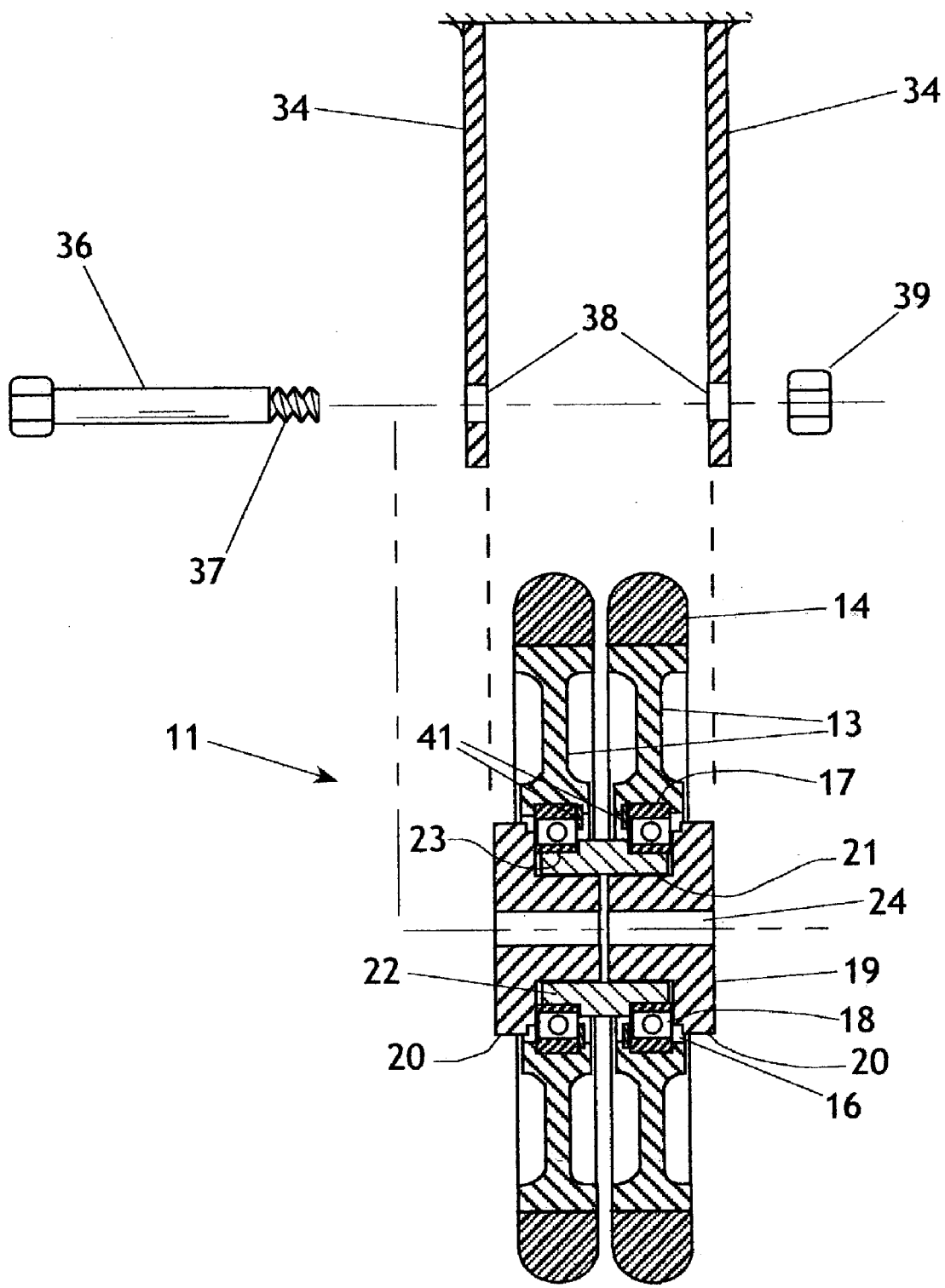
FIG. 5 is an exploded cross-sectional view of the independently rotating, split tread single wheel assembly of the present invention.

The present invention generally comprises a wheel assembly that features two independently rotatable split treads in side-by-side relationship, and a clevis-like bracket extending outwardly of the two wheels to support the wheels. The split tread design has substantially the same form factor and dimensions as a prior art single wheel typically used in a caster assembly, as shown in FIG. 1, while providing superior pivoting and low speed turning characteristics. With regard to FIGS. 4–6, the wheel assembly 11 includes a sub-assemblies 12, each having a pair of central disks 13 in closely adjacent relationship. Each disk 13 is provided with an outer tread 14 secured to the periphery thereof. The disk 13 may be formed of metal such as steel or aluminum, or cast or molded of plastic or polymer material, as is suitable for the expected loads and usage. A central aperture 16 in each disk 13 includes an annular recess 17 that is dimensioned to receive and secure a sealed ball bearing assembly 18. A pair of hub inserts 19 extend into the central aperture 16, each hub insert 19 having a central annular surface 21 and an outer flange portion 20. The inserts 19 are disposed side-by-side in axial alignment with the surfaces 21 in adjacent relationship. A cylindrical spacer 22 extends about the surfaces 21 of both hub inserts 19, and includes spaced apart annular lands 23 at opposed ends of the spacer to support and retain the inner races of the ball bearing assemblies 18. Thus the wheel disks 13 are both supported by the same spacer component, yet are independently rotatable. Each hub insert 19 includes a central bore 24.

Figure 6:
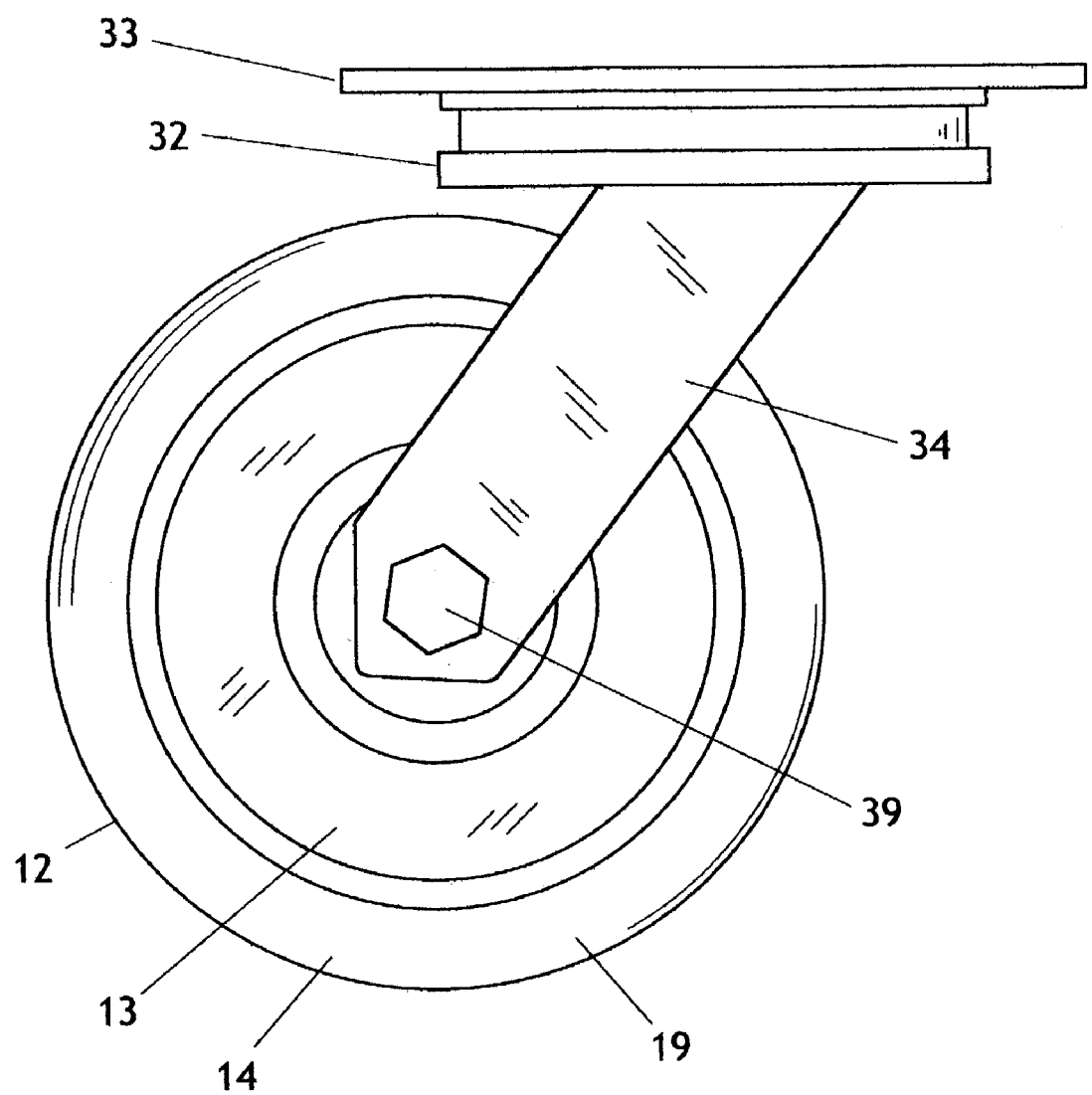
FIG. 6 is a side elevation of the independently rotating, split tread single wheel assembly depicted in FIGS. 4 and 5.

The wheel assembly 11 may typically be supported by a clevis-like bracket assembly 31, which may include a pivot bearing assembly 32 extending from a mounting plate 33. The configuration and dimensions of the bracket assembly are generally similar to prior art single wheel caster assemblies, and it is a unique aspect of the invention that two independently rotatable treads 14 are supported within this configuration. A pair of arms 34 extend from the bearing assembly, and are spaced apart sufficiently to receive therebetween the wheel assembly 11. An axle 36 extends through aligned holes 38 in distal portions of the arms 34, and also through the central bores 24 of the hub inserts 19, and is secured by a nut 39. The nut 39 is tightened to compress the hub inserts 19 inward against the bearing assemblies 18, which are thus held in their respective lands 23 in the spacer 22. The arms 34 not only support the axle 36, but also serve to protect substantial portions of the wheel assembly 11 from side impact during incidental collisions with other objects. The arms 34 may extend at an angle that diverges from vertical, as shown in FIG. 6, to establish a rake angle so that the caster will pivot to follow any path of motion of the movable object.

The split treads 14 of the invention rotate completely independently, reducing drag and enabling each tread to increase or decrease speed to accommodate its respective path length through the arc of any turn. Likewise the two treads 14 may counter-rotate whenever the caster is required to pivot about the vertical axis of mounting bearing 32. The load supported by the wheel assembly is distributed evenly about the center line of the wheel, balancing the load to minimize any side load on the bearing 32. Operating noise and vibration can be controlled by selection of the hardness of the tread material, which is also selected in accordance with the expected load, operating environment, and conditions of use, such as towed versus manual applications. The hardness of the tread material also affects ground contact friction, whereby lateral sliding during turns may be controlled.

The wheel disk 13 may be fabricated of any rigid compound or material having sufficient strength and stiffness to support the tread 14 and the bearings 18. Two primary material selections are aluminum for medium to heavy duty applications, and injected plastic for light to medium duty applications. Plastics may be selected for operation in alloy-free environments where tolerate the presence of rust or oxidation cannot be tolerated.

The bearings 18 are preferably precision shielded and sealed ball bearings which reduce rolling resistance. The bearings are greater in diameter than typical wheel assemblies, thus permitting larger diameter balls having greater circumference and yielding lower starting friction and rolling friction. The bearings 18 are each disposed within the nominal plane of their respective wheel disks 13, which increases the rated load capacity of the assembly. A retaining ring 41 may be employed to lock each bearing 18 in place in the respective wheel disk.

Each bearing 18 may be pressed into the respective groove 17 of the respective wheel disk 13, and the retaining rings 41 may then be installed. The wheel disk/bearing assemblies are then assembled to the spacer 22, and the hub inserts 19 are pressed into the central opening of the spacer. This assembly is then secured to the axle as described previously. The hub inserts serve as a built-in thread guard that eliminates debris from becoming wrapped about the axle assembly. Furthermore, the large diameter of the hub inserts acts as a guard for the bearings, reducing considerably the opportunity for debris and liquids to contaminate the bearings. In addition, the hub inserts, together with the spacer and bearings, form a large cross-sectional area solid assembly that extends between the arms 34 and substantially strengthens the distal end portions of the arms 34, wherein the arms are more resistant to collision impact.

The split tread single wheel assembly of the invention may also be employed with a caster mounting bracket that is not pivotable with respect to the movable object, whereby the advantages of the independently rotating split tread are provided to the fixed direction caster assembly.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A split tread wheel assembly, including:
   a pair of tread assemblies disposed in closely spaced, axially aligned relationship, and means for supporting said pair of tread assemblies on a common structural element in independently rotatable fashion;
   each of said tread assemblies including a central aperture, and a pair of sealed ball bearing assemblies, each secured within said central aperture of one of said tread assemblies;
   further including a generally cylindrical spacer having a pair of annular lands at opposed ends thereof, each of said annular lands disposed to engage the inner race of one of said pair of bearing assemblies.

2. The wheel assembly of claim 1, wherein each of said tread assemblies includes a central disk and an outer tread supported on a circumferential surface of said disk.

3. The wheel assembly of claim 1, wherein said bearing assembly is press fit into said central aperture.

4. A split tread wheel assembly, including:
   a pair of disk assemblies disposed in closely spaced, axially aligned relationship, and means for supporting said pair of disk assemblies on a common structural element in independently rotatable fashion;
   each of said disk assemblies including a central disk and an outer tread supported on a circumferential surface of said disk,
   said disk including a central aperture, and a sealed ball bearing assembly secured within said central aperture;
   further including a generally cylindrical spacer having a pair of annular lands at opposed ends thereof, each of said annular lands disposed to engage the inner race of one of said pair of bearing assemblies.

5. The wheel assembly of claim 4, wherein said spacer comprises a tubular member having an axial opening therethrough, and further including a pair of hub inserts adapted to be received within said axial opening of said spacer.

6. The wheel assembly of claim 5, wherein each of said hub inserts includes a cylindrical portion dimensioned to be press fit into said axial opening of said spacer.

7. The wheel assembly of claim 5, wherein each of said hub inserts includes a flange portion disposed to impinge on said inner race of said bearing assembly of one of said pair of disks.

8. The wheel assembly of claim 7, wherein said flange portion of said hub insert defines an outer end surface of said hub insert, said outer end surface impinging on an inner confronting surface of one of a pair of arms of a mounting bracket assembly.

9. The wheel assembly of claim 8, wherein said pair of hub inserts each includes a central bore extending axially therethrough.

10. The wheel assembly of claim 9, further including an axle extending through said central bores of said hub inserts.

11. The wheel assembly of claim 10, wherein said pair of arms of said mounting bracket assembly include aligned holes in distal portions thereof, said axle extending through said aligned holes to secure said pair of disk assemblies between said pair of arms.

12. The wheel assembly of claim 11, further including threaded means for applying axially compressive force to opposed ends of said axle to urge said pair of arms each toward the other and compressively impinge on said outer end surfaces of said hub inserts.

13. The wheel assembly of claim 8, further including means for pivoting said mounting bracket assembly about a pivot axis generally perpendicular to the axially aligned relationship of said pair of disks.

14. The wheel assembly of claim 13, wherein said arms extend at an angle diverging from said pivot axis to define a rake angle.

15. The wheel assembly of claim 8, wherein said pair of arms are spaced apart and the spacing of said arms is substantially equal to the width of a typical single wheel caster assembly.

* * * * *